March 10, 1959  M. J. PASQUALE  2,876,487
SHRIMP KNIFE
Filed Aug. 15, 1956

INVENTOR
MICHAEL J. PASQUALE
BY
Lindsey and Prutzman
ATTORNEYS

United States Patent Office 2,876,487
Patented Mar. 10, 1959

2,876,487
SHRIMP KNIFE

Michael J. Pasquale, Middletown, Conn.

Application August 15, 1956, Serial No. 604,203

2 Claims. (Cl. 17—7)

This invention relates to a tool for simultaneously deveining and shelling a shrimp. The process of deveining and shelling shrimp has always been a time consuming and laborious task particularly for a person not experienced in the process. Even the professionally experienced person using heretofore available tools for the task must expend considerably more time than is desirable. Therefore, it is an object of the invention to provide a novel and improved tool whereby a shrimp may be quickly deveined and shelled in one simple operation.

It is a further object of this invention to provide a tool of the type described which will permit an inexperienced person to devein and shell shrimp with the speed and efficiency superior to that attainable by skilled personnel utilizing heretofore available tools.

It is still a further object of this invention to provide a tool of the type described which is simple and economical to fabricate and which will have no moving parts, thus assuring a long and trouble-free service life.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
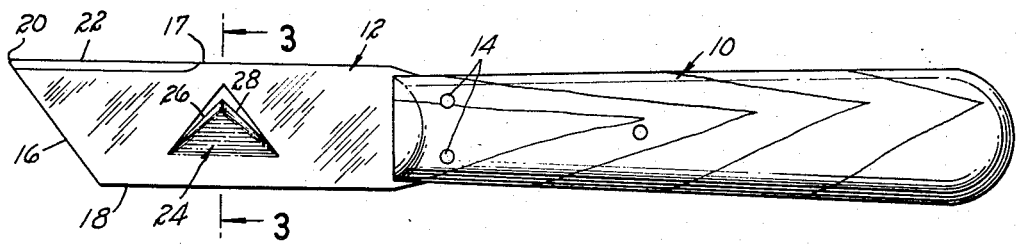
Fig. 1 is a bottom view of a tool constructed in accordance with the invention.
Figure 2:
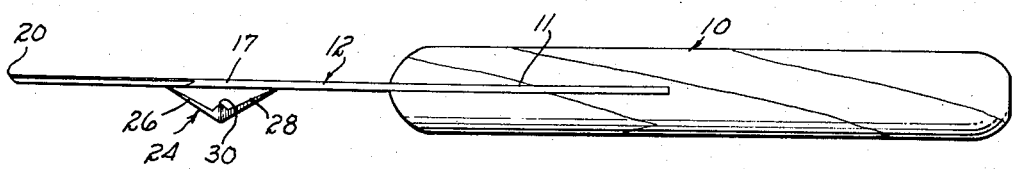
Fig. 2 is an edge view of the tool of Fig. 1.
Figure 3:
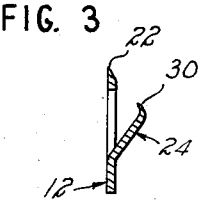
Fig. 3 is a cross-sectional view of the tool of Fig. 1 taken along the lines 3—3.

With reference to the drawings a shrimp deveining and shelling tool constructed in accordance with the invention is comprised of a handle 10 having a slot 11 extending longitudinally from one end thereof. A substantially flat blade 12, fabricated of a suitable metal which will hold a cutting edge, is secured in the slot 11 by means such as rivets 14. The portion of the blade 12 extending beyond said one end of the handle is generally rectangular but has an end 16 angularly related to the front edge 17 and rear edge 18 of the blade to form a point 20. The front edge 17 of the blade is provided at 22 with a knife edge whereby the blade may be used for opening clams or oysters or for other cutting operations such as butterflying shrimp.

In accordance with the invention a triangular portion 24 is struck out from the blade 12 approximately centrally thereof. The sides 26 and 28 of the struck out portion 24 extend transversely of the blade 12 toward the front edge 17 thereof and each is provided with a knife edge extending therealong from the juncture thereof, thus forming a sharp point at the juncture. Further, it is preferred that the apex formed at the juncture of the edges 26 and 28 of the struck out portion 24 to be turned or bent over toward the main body of the blade to provide a hook-like projection 30, having its distal end extending generally toward the blade.

In using a knife constructed in accordance with the invention to devein and shell a shrimp, the knife handle is grasped in the hand, and the sharp point of the hook-like projection 30 of the struck out portion 24 is placed at or just behind the neck of the shrimp. The knife is then drawn rearwardly of the shrimp whereupon the knife edges 26 and 28 will sever the shell of the shrimp while at the same time the sharp point of the struck out portion 24 will remove the vein of the shrimp. Subsequently, if it is desired to butterfly the shrimp or possibly to remove a trace of vein the knife edge 22 and the sharp point 20 of the blade may be utilized.

Thus there has been provided a novel culinary tool with which a shrimp may be simultaneously deveined and shelled and in addition which is particularly suited for further cleaning of the shrimp or other cutting operations thereon. The use of a knife constructed in accordance with the invention as above described obviously results in a material saving in time, which in a commercial operation is of considerably importance. The simplicity of construction of the knife makes its manufacture exceedingly economical, and its novel construction permits an inexperienced user to achieve performance in deveining and shelling shrimp superior to that of a skilled user with heretofore available devices.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A knife for simultaneously deveining and shelling shrimp comprising a handle, a blade mounted on the handle, a shrimp deveining and shelling member integral with the blade comprising a generally triangular portion of the blade disposed intermediate and spaced from the longitudinal edges thereof and having one side integral with the blade and two sides separated therefrom and inclined angularly from the general plane of the blade and generally transversely of the blade, means providing a knife edge along each of said two sides, and a hook-like projection at the juncture of said two sides with its distal end extending generally toward the general plane of the blade.

2. A knife for simultaneously deveining and shelling shrimp comprising a handle, an elongated blade mounted on the handle, the free end of said blade forming an acute angle with one edge of the blade, means providing a knife edge on said one edge of the blade, extending from the juncture of said one end and said one edge, a generally triangular member on the blade disposed intermediate and spaced from the longitudinal edges of the blade and having one side integral with the blade and two sides inclined angularly out of the general plane of the blade and generally transversely of the blade and toward said one edge, and means providing a knife edge along each of said two sides, extending from the juncture thereof, the apex portion of said member formed by the juncture of said two sides curving toward said one edge of the blade.

References Cited in the file of this patent

UNITED STATES PATENTS

| | | |
|---|---|---|
| 912,146 | Moffett | Feb. 9, 1909 |
| 991,953 | Chandler | May 9, 1911 |
| 2,079,496 | Domack | May 4, 1937 |

FOREIGN PATENTS

| | | |
|---|---|---|
| 230,885 | Germany | Feb. 8, 1911 |